United States Patent [19]
Goodwin et al.

[11] Patent Number: 6,072,680
[45] Date of Patent: Jun. 6, 2000

[54] HIGH TEMPERATURE LOCKOUT AND THERMOSTAT

[75] Inventors: Shaun Goodwin, East New Market; David J. Charvat, Berlin, both of Md.

[73] Assignee: Airpax Corporation, LLC, Frederick, Md.

[21] Appl. No.: 09/222,396

[22] Filed: Dec. 29, 1998

Related U.S. Application Data

[60] Provisional application No. 60/094,433, Jul. 28, 1998.

[51] Int. Cl.$^7$ ....................................................... H02H 5/04
[52] U.S. Cl. .......................... 361/104; 361/105; 361/93.8
[58] Field of Search ................................... 361/104, 105, 361/93.8, 71–72, 74

[56] References Cited

U.S. PATENT DOCUMENTS 5,864,458   1/1999   Duffy et al. ............................. 361/93

*Primary Examiner*—Michael J. Sherry
*Attorney, Agent, or Firm*—Milde, Hoffberg & Macklin, LLP

[57] ABSTRACT

A system and method for interrupting the power to a load, comprising a contact interposed between the source of power and the load, receiving power from the power supply to a circuit on the power supply side of the contact, the circuit comprising a series connection of a resettable fuse device, a bi-metallic switch, and a contact control, the resettable fuse device side of the circuit being electrically connected to the power source and the contact control being the closest of the three series components electrically connected to ground, the contact control having an electrical interface with the contact, the contact remaining in a closed position when power is supplied to the contact control and the contact remaining in an open position when power is interrupted to the contact control, the circuit further comprising a first bypass segment connecting the side of the resettable fuse opposite the power supply to a point between the contact and the load, the first bypass segment having an electrically open portion that is closeable, and the circuit further comprising a second bypass segment around the resettable fuse device, the second bypass segment having an electrically open portion that is closeable. The resettable fuse device is preferably a positive temperature coefficient element whose temperature is responsive to an electrical current passing therethrough.

14 Claims, 2 Drawing Sheets

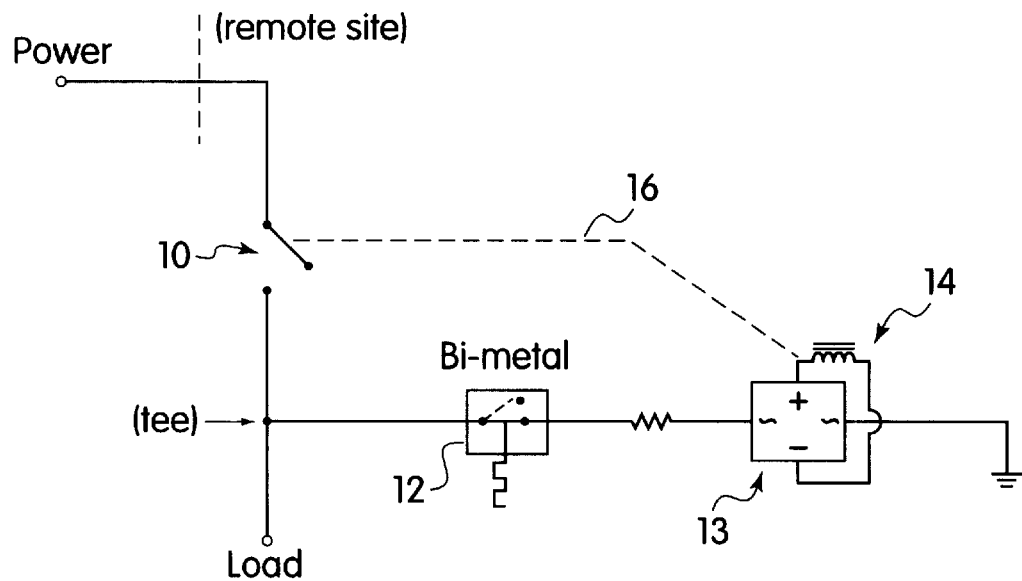
FIG. 1 (Manual Reset)
Prior Art
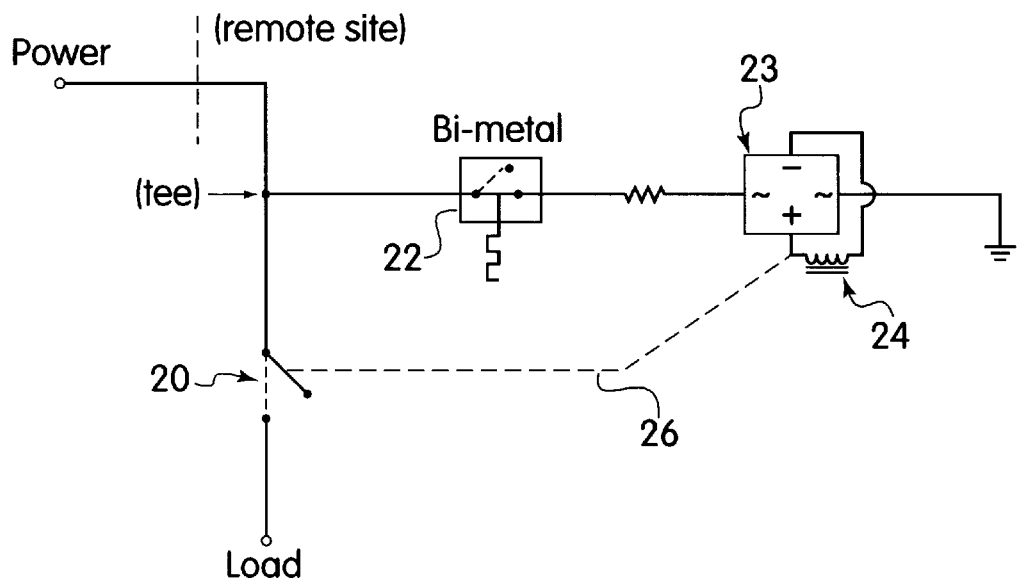
FIG. 2 (Automatic Reset)
Prior Art

HIGH TEMPERATURE LOCKOUT AND THERMOSTAT

Priority is claimed to co-pending provisional application Ser. No. 60/094,433, filed Jul. 28, 1998.

BACKGROUND OF THE INVENTION

This invention is directed to systems and devices for measuring and/or regulating temperature of an electronic device or system at a remote location.

There are many situations where power is supplied to a device or system that is at a physically remote location. An example of such a device or system is a station for a cellular telephone network. Such stations can be located in direct sunlight in the middle of the summer, or in the middle of a desert. The temperatures can become excessive, where continued operation of the device or system can damage the system.

High temperature extremes can also be created at such remote locations by excessive demand by the device or system. This can also be aggravated by the ambient temperature. For example, electrical transformers serving a neighborhood can experience their highest load during peak summer heat, when air conditions are being run.

As noted above, such devices and systems can typically be in remote locations, sometimes miles from the power source. They are also typically physically separated from the area for monitoring and controlling the system (collectively referred to as the "management site"). (The power source can be located in the same facility as the management site, or separate from it.) The temperature sensing device, of course, must be located together with the device or system that it is to protect.

The contact or switch that is used to interrupt power from the load (i.e., the system or device) is also typically located at the remote location. Having the switch or contact located upstream (i.e., closer to the power source or management site) from the remote location is often not feasible or is uneconomical.

FIG. 1 gives a representative example of a system for temperature sensing and control of the power to a load at a site that is remote from the power source. (The dashed line in FIG. 1 adjacent the power is intended to represent a significant distance between the power supply and the load.)

In FIG. 1, the power source is electrically connected to the load through contact 10. Contact 10 is actually one of the contacts of relay 14, described further below. The contact 10 is in the same area as the load, remote from the power supply. On the load side of the contact 10, a tee in the line leads to ground through a bi-metallic switch 12 and a full wave rectifier 13. (A resistor regulates the power to the full wave rectifier 13.) When power is supplied to the full wave rectifier 13, it powers relay 14 with D.C. current. Relay 14 controls the state of contact 10, as represented by dashed line 16. (As noted above, contact 10 is typically part of the relay 14 device.) When the relay 14 is powered, contact 10 is closed. When power to the relay 14 is interrupted, contact 10 is opened.

In the normal operating state, power is thus supplied to the load. The bi-metal switch 12 is in a closed state, power is thus supplied to relay 14 (via rectifier 13), and contact 10 is closed. Bi-metallic switch 12 has a temperature threshold, above which it opens. (The threshold temperature is a function of a number of variables, such as the metals used, their configuration, etc.) When the temperature threshold of bi-metallic switch 12 is exceeded, power to rectifier 13 and thus relay 14 is interrupted and contact 10 is opened, thus interrupting power to the load.

Some bi-metallic switches reset (close) when they cool beyond a certain temperature. However, even if bi-metallic switch 12 in FIG. 1 automatically resets after cooling, power is not immediately restored to relay 14, because open contact 10 is interposed between the power an d the tee.

Thus, after bi-metallic switch 12 cools and closes, contact 10 must be reset in order to restore po w er to the load. Once contact 10 is re-set, power is also restored to the rectifier 13 and relay 14, which serves to maintain contact 10 close d.

Thus, the configuration of FIG. 1 requires that the contact 10 be manually re-set in order to restore power to the load. This in itself is not undesirable, since the load can represent a system that must be re-started under certain conditions or protocols. However, since contact 10 is often at the remote site in FIG. 1, having to manually re-set the contact 10 can be unacceptable.

SUMMARY OF THE INVENTION

It is thus desirable to have a temperature sensing and control device at a location separate from either the power source and/or the management site that can be configured for either automatic or manual resetting. When in a manual reset mode, it is also desirable that the device be capable of being reset at the power source and/or the management site.

In accordance with these objectives, the invention provides a system for interrupting the power to a load at a remote location when a temperature threshold is exceeded. The system comprises a contact that is interposed between the source of power and the load and which ultimately serves to disconnect the power from the load. The system also comprises a circuit that receives power from the power supply on the power supply side of the contact, that is, can receive power even when power to the load is interrupted.

The circuit includes a resettable fuse device, a bi-metallic switch and a contact control in series connection. The resettable fuse device is the component of the circuit closest to the power source. The contact control is closest to ground.

The contact control can be, for example, a full wave rectifier that supplies D.C. to a relay. The contact control has an electrical interface with the contact (for example, the contact is one of the relay contacts). When power is supplied to the contact control, the contact remains closed, thus allowing power to be supplied to the load. When power to the contact control is interrupted, the contact remains open, thus preventing power to be supplied to the load.

The bi-metallic switch may be of the type that opens when a temperature threshold is exceeded and automatically resets as the temperature falls below the threshold. Thus, when the threshold is exceeded, and the bi-metallic switch opens, power to the contact control is interrupted, contact is opened, and power to the load is interrupted.

The circuit further comprises a first bypass segment that connects the side of the resettable fuse opposite the power supply to a point between the contact and the load. The first bypass segment also has an electrically open portion that is closeable (a first "jumper"). The circuit also comprises a second bypass segment around the resettable fuse device. The second bypass segment also has an electrically open portion that is closeable (a second "jumper").

When the second jumper is closed, the system operates in an "automatic" mode. The resettable fuse is eliminated from the system and power is interrupted and restored to the load via the contact in accordance with the state of the bi-metallic switch. Thus, when the bi-metallic switch is open (temperature threshold exceeded), power to the load is interrupted. When the bi-metallic switch is closed (temperature cools below the threshold), power to the load is automatically restored.

When the first jumper is closed, opening of the bi-metallic switch (and, consequently, the contact) causes the resettable fuse device to trip. When the bi-metallic switch cools and closes, power is not automatically restored to the load—the open fuse prevents power from being restored to the contact control, so the contact remains open.

Thus, with the first jumper closed, the fuse must be reset. If the resettable fuse is of the type that resets upon power down, it can be reset from at the power source or the monitoring site by disconnecting the power.

BRIEF DESCRIPTION OF THE DRAWINGS

FIG. 1 is a representative drawing of a device and system for interrupting the power supplied to a load at a remote location;

FIG. 2 is a representative drawing of a device and system for interrupting the power supplied to a load at a remote location;

DETAILED DESCRIPTION

Figure 3:
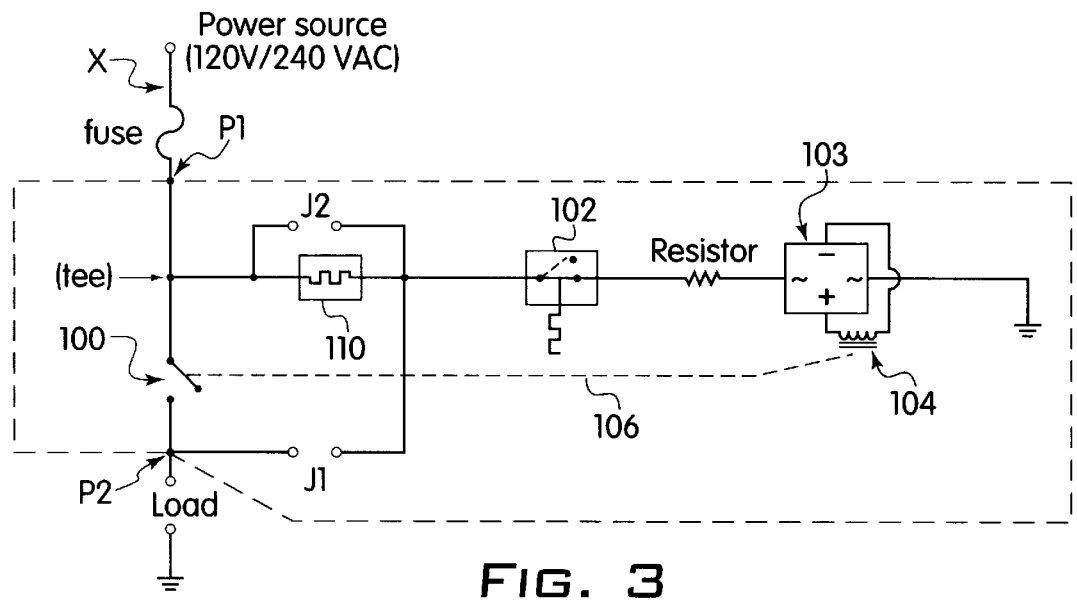
FIG. 3 is a representative drawing of a device and system for interrupting the power supplied to a load at a remote location in accordance with the present invention.

FIG. 2 gives a representative example of a system for temperature sensing and control of the power to a load at a site that is remote from the power source. As in FIG. 1, the power source in FIG. 2 is electrically connected to the load through a contact 20. Again in FIG. 2, a tee in the line leads to ground through a bi-metallic switch 22 and a full wave rectifier 23. (As in FIG. 1, when power is supplied to the full wave rectifier 23, it powers relay 24 with D.C. current. Also, a resistor regulates the power to the full wave rectifier 23.) In FIG. 2, however, the tee is located between contact 20 and power supply.

Relay 24 again controls the state of contact 20, as represented by dashed line 26. When relay 24 is powered, contact 20 is closed. When power to the relay 24 is interrupted, contact 24 is opened. Thus, in the normal operating state, power is supplied to the load. The bi-metal switch 22 is in a closed state, power is thus supplied to relay 24 (via rectifier 23), and contact 20 is closed. When the temperature threshold of bi-metallic switch 22 is exceeded, power to relay 24 is interrupted and contact 20 is opened, thus interrupting power to the load.

Unlike the arrangement of FIG. 1, if bi-metal switch 22 in FIG. 2 automatically resets after cooling, power is immediately restored to relay 24, because the tee is between the power and the contact 20. Once power is supplied to the relay 24, of course, contact 20 is closed and power is restored to the load.

Thus, after bi-metallic switch 22 cools, the arrangement in FIG. 2 will automatically restore power to the load. This, of course, overcomes the problem of having to manually re-set a contact at a remote location, as in the configuration of FIG. 1. As noted above, however, certain systems or devices must be re-started under controlled conditions after losing power. For such systems or devices, the automatic reset configuration of FIG. 1 is unacceptable.

FIG. 3 is a schematic of an embodiment of the present invention that can be used with different systems or devices in different modes, according to the requirements of the particular system or device. The power source is connected to a load through contact/switch 100. (A fuse is also interposed between the power source and the load, above the tee leading to the control system discussed below, thus serving to protect the overall system.)

A tee in the line (between the power and the contact 100) leads to ground through a resettable fuse device 110, described further below, a bi-metallic switch 102 and a full wave rectifier 103. When power is supplied to the full wave rectifier 103, it powers relay 104 with D.C. current. (The power to the full wave rectifier is regulated by resistor.)

Relay 104 controls the state of contact 100, as represented by dashed line 106. (Contact 100 may be one of the relay contacts.) When relay 104 is powered, contact 100 is closed. Thus, in the normal operating state, resettable fuse device 110 and bi-metallic switch 102 conduct current, power is supplied to relay 104 via rectifier 103, and contact 100 is closed. Accordingly, in the normal operating state, power is also supplied to the load.

When power to the rectifier 103 is interrupted, power to relay 104 is also interrupted and contact 100 is opened. When the temperature threshold of bi-metallic switch 102 is exceeded, causing it to open, power to relay 104 is consequently interrupted (via rectifier 103), causing contact 100 to open. Thus, power to the load is interrupted when the threshold temperature of bi-metallic switch 102 is exceeded.

In addition to the features described above, the circuit of FIG. 3 includes two "jumper" points, labeled J1 and J2. The jumper points J1 and J2 are representative of an open portion in the electrical circuit which can be easily closed in order to complete the circuit of which the jumper is a part. Thus, jumper J1 in FIG. 3 can close an otherwise open circuit that connects the power source to the load through resettable fuse 110. Jumper J2 in FIG. 3 can close an otherwise open circuit that eliminates resettable fuse 110 from the "tee" circuit.

For one operational state of the circuit of FIG. 3, Jumper J2 is closed, thus completing an electrical bypass that eliminates the resettable fuse from the "tee" circuit. As described above, in the normal operating state of this configuration, the temperature threshold of the bi-metallic switch is not exceeded, bi-metallic switch 102 is closed, and power is supplied to relay 104 via rectifier 103. Consequently, contact 100 is closed and power is supplied to the load.

When the temperature threshold of bi-metallic switch 102 is exceeded, power to rectifier 103 and thus relay 104 is interrupted. Contact 100 is opened and power to the load is interrupted. If bi-metallic switch 102 automatically resets after cooling, then the circuit of FIG. 3 with J2 closed will also automatically restore power to the load: Upon cooling, power is again supplied to relay 114 (via rectifier 113), contact 100 is closed, and power is restored to the load.

The arrangement in FIG. 3 having jumper J2 completed automatically restores power to the load and is thus similar in operation to the circuit of FIG. 2 above. Thus, it can be used in this configuration when automatic re-start of the load is acceptable.

As previously noted, however, for many systems automatic re-start is unacceptable. A second configuration of the circuit of FIG. 3 is achieved by closing jumper J1 (and leaving J2 open). As described above, for this configuration, power is also supplied to the load in the normal operating state (i.e., where the temperature threshold of the bi-metallic switch is not exceeded): Bi-metal switch 102 is closed, power is supplied to relay 104 via rectifier 103, and contact 100 is closed.

When the temperature threshold of bi-metallic switch 102 is exceeded, power to rectifier 103 and thus relay 104 is interrupted and contact 100 is opened. By opening contact 100, all current from the power source directed to the load is diverted through the circuit segment that includes resettable fuse 110 and jumper J1. This surge in current through resettable fuse 110 causes it to trip, thus interrupting power to the load.

If bi-metal switch 102 automatically resets after cooling, then the circuit in this configuration will not automatically restore power to the load, because resettable fuse device 110 is open. Resettable fuse device 110 must be actively reset before power is again supplied to relay 104 (via rectifier 103), contact 100 is closed, and power is restored to the load.

If resettable fuse device 110 must be re-set by an operator interfacing directly with the fuse device, then the same difficulty arises as that discussed above with respect to manually re-setting the contact for the circuit of FIG. 1. Because the resettable fuse device 110 is remote from the power supply and/or the management site, a manual re-set is often not feasible.

To address this, a resettable fuse device 110 that resets upon "power down" is used. Certain fuse devices reset when they are disconnected from the power source (or, equivalently, the voltage applied across the open fuse is temporarily interrupted). For example, the "Polyswitch" (tm) of Raychem Corp. is such a resettable fuse device. When the polyswitch (tm) is opened or "blown", it can be reset by interrupting its connection to the power source for a brief period of time. (Typically, power must be interrupted for approximately one minute for resetting.)

If such a "power down" resettable fuse device 110 (such as a Polyswitch (tm)) is used for the configuration of FIG. 3 with J1 closed, then resetting the fuse device 110 can be accomplished at the power supply and/or the management site by disconnecting the power source (for example, by a switch or other means at the point "X" shown in FIG. 3) for the time it takes the device 110 to reset. When power is restored, and presuming that the temperature conditions have permitted bi-metallic switch 102 to automatically reset, power is again supplied to the load: Power is restored via fuse device 110 and bi-metallic switch 102 to rectifier 103 and relay 104, which serves to close contact 100.

Thus, the system and device of FIG. 3 gives an alternative configuration (J1 closed, J2 open) that permits reset and restoration of power to the load from a remote location.

The control portions of FIG. 3 can be manufactured as a separate unit that can be attached to a system at the remote location and which allows the purchaser to determine the mode of operation (automatic or manual reset). All components shown between points P1 and P2 (enclosed by dashed lines) can be readily incorporated into a separate electronic unit.

Figure 4:
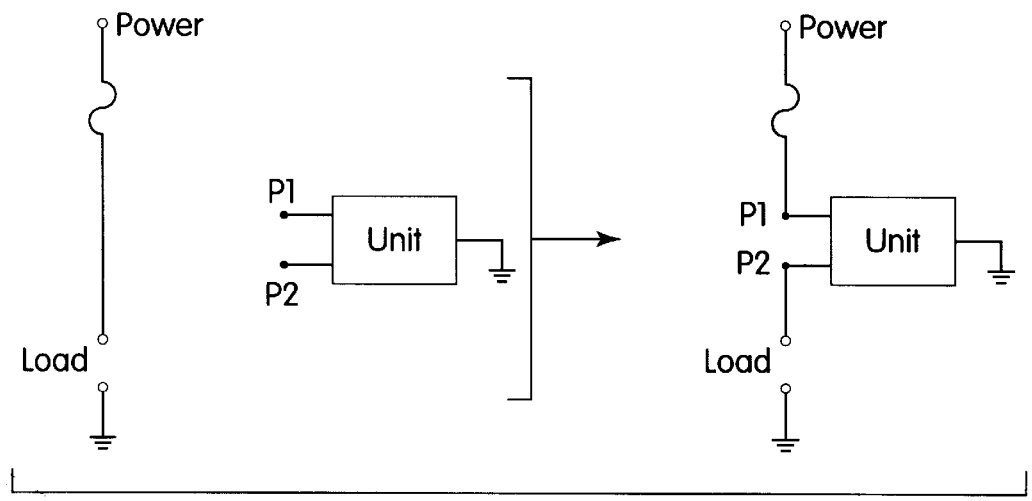
FIG. 4 is a representative drawing of a packaging of a device according to the present invention.

A unit having such components is represented as a box in FIG. 4, having interface points P1 and P2. Also shown in FIG. 4 is a power supply connected to a load, but not having the temperature protection aspects shown in FIG. 3 and described above. As also shown in FIG. 4, the unit can easily be spliced into such an existing circuit at points P1 and P2, giving the identical electrical circuit as in FIG. 3.

EXAMPLE 1

A high temperature lockout and thermostat was constructed in accordance with the schematic of FIG. 3 using a Raychem Polyswitch (tm), part no. TR250-120U, as the resettable fuse. The Polyswitch (tm) is rated at 250V and has a maximum current (trip current) of 30 mA. The bi-metallic switch was part no. 66F060 by Philips Technologies, rated at 140° C., with contact normally closed. The full-wave rectifier was a standard 4x1N4007 available from many manufacturers, such as Motorola. The resistor R is chosen to adjust the voltage to the full-wave rectifier; in this case, 7 KΩ.

The relay had normally closed contacts. The relay contacts and fuse are chosen according to the amperage requirements of the load.

The device described above, configured as in FIG. 3, will interrupt power when the temperature exceeds 140° C. and the bi-metallic switch opens. Upon cooling of the bi-metallic switch, power is restored automatically or by powering down the Polyswitch (tm), depending on, respectively, whether J2 is closed or J1 is closed.

The above described structures and methodology are merely illustrative of the principles of the present invention. Numerous modifications and adaptations thereof will be readily apparent to those skilled in the art without departing from the spirit and scope of the present invention and the appended claims.

What is claimed is:

1. A system for interrupting the power to a load, the system comprising a contact interposed between the source of power and the load, the system also comprising a circuit that receives power from the power supply on the power supply side of the contact, the circuit comprising a resettable fuse device, a bi-metallic switch and a contact control in series connection, the resettable fuse device side of the circuit electrically connected to the power source and the contact control being the closest of the three series components electrically connected to ground, the contact control having an electrical interface with the contact, the contact remaining in a closed position when power is supplied to the contact control and the contact remaining in an open position when power is interrupted to the contact control, the circuit further comprising a first bypass segment connecting the side of the resettable fuse opposite the power supply to a point between the contact and the load, the first bypass segment having an electrically open portion that is closeable and the circuit further comprising a second bypass segment around resettable fuse device, the second bypass segment having an electrically open portion that is closeable.

2. A system as in claim 1, wherein the contact control is a full wave rectifier electrically connected to a relay.

3. A system as in claim 1, wherein the resettable fuse device resets to a conducting state upon interrupting power to the device.

4. A system as in claim 1, wherein the bi-metallic switch opens when a temperature threshold is exceeded.

5. A system as in claim 4, wherein the bi-metallic switch automatically resets to a conducting state when the switch cools below the threshold temperature.

6. A system as in claim 1, wherein the resettable fuse device comprises a positive temperature coefficient element whose temperature is responsive to an electrical current passing therethrough.

7. A system for interrupting power supplied to a load, the system comprising a first electrical connection point connected to a second electrical connection point via a contact, the system also comprising a circuit comprising a resettable fuse device, a bi-metallic switch and a contact control in series connection, the resettable fuse device side of the circuit electrically connected to a point between the first electrical connection point and the contact, the contact control having a ground connection and an electrical interface with the contact, the contact remaining in a closed position when power is supplied to the contact control and remaining in an open position when power is interrupted to the contact control, the circuit further comprising a first bypass segment connecting the side of the resettable fuse opposite the power supply to a point between the contact and the load, the first bypass segment having an electrically open portion that is closeable and the circuit segment further comprising a second bypass segment around resettable fuse device, the second bypass segment having an electrically open portion that is closeable.

8. A system as in claim 7, wherein the resettable fuse device comprises a positive temperature coefficient element whose temperature is responsive to an electrical current passing therethrough.

9. A method for interrupting the power to a load, the method comprising:

interposing a contact between the source of power and the load;

receiving power from the power supply to a circuit on the power supply side of the contact, the circuit comprising a series connection of:
   a resettable fuse device,
   a bi-metallic switch, and
   a contact control, the resettable fuse device side of the circuit being electrically connected to the power source and the contact control being the closest of the three series components electrically connected to ground, the contact control having an electrical interface with the contact, the contact remaining in a closed position when power is supplied to the contact control and the contact remaining in an open position when power is interrupted to the contact control, the circuit further comprising a first bypass segment connecting the side of the resettable fuse opposite the power supply to a point between the contact and the load, the first bypass segment having an electrically open portion that is closeable, and the circuit further comprising a second bypass segment around the resettable fuse device, the second bypass segment having an electrically open portion that is closeable.

10. A method as in claim 9, wherein the contact control is a full wave rectifier electrically connected to a relay.

11. A method as in claim 9, wherein the resettable fuse device resets to a conducting state upon interrupting power to the device.

12. A method as in claim 9, wherein the bi-metallic switch opens when a temperature threshold is exceeded.

13. A method as in claim 9, wherein the bi-metallic switch automatically resets to a conducting state when the switch cools below the threshold temperature.

14. A method as in claim 9, wherein the resettable fuse device comprises a positive temperature coefficient element whose temperature is responsive to an electrical current passing therethrough.

* * * * *